March 4, 1958 H. C. VERNON 2,825,688
POWER GENERATING NEUTRONIC REACTOR SYSTEM
Filed Nov. 13, 1945 6 Sheets-Sheet 1

Witnesses:
Herbert E. Metcalf
Henry H. Johnson

Inventor:
Harcourt C. Vernon
By: Robert A. Lanusden
Attorney

March 4, 1958 H. C. VERNON 2,825,688
POWER GENERATING NEUTRONIC REACTOR SYSTEM
Filed Nov. 13, 1945 6 Sheets-Sheet 2

Witnesses:
Herbert E. Metcalf
Henry H. Johnson

Inventor:
Harcourt C. Vernon
By: Robert A. Lavender
Attorney

March 4, 1958 H. C. VERNON 2,825,688
POWER GENERATING NEUTRONIC REACTOR SYSTEM
Filed Nov. 13, 1945 6 Sheets-Sheet 3

Witnesses:
Herbert E. Metcalf
Henry W. Johnson

Inventor:
Harcourt C. Vernon
By Robert M. Saunders
Attorney

March 4, 1958    H. C. VERNON    2,825,688
POWER GENERATING NEUTRONIC REACTOR SYSTEM
Filed Nov. 13, 1945    6 Sheets-Sheet 4
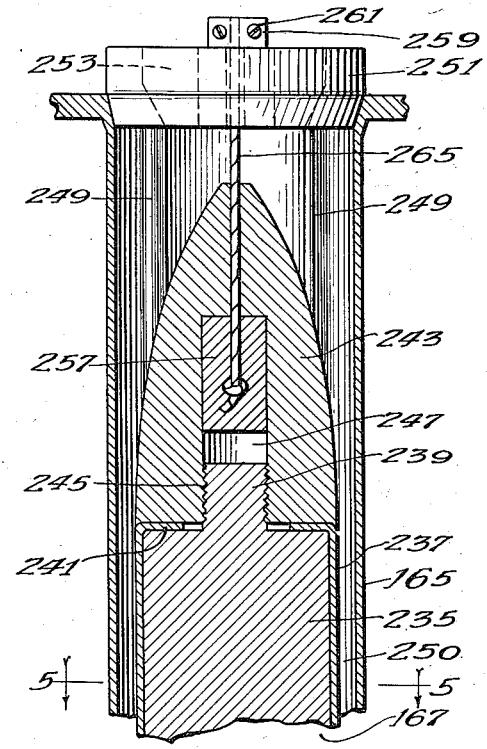
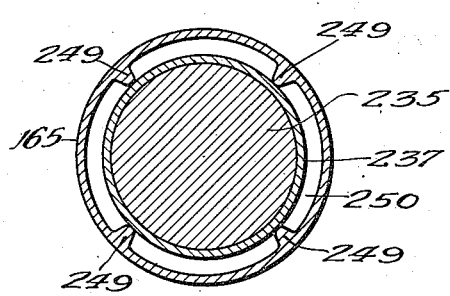
FIG. 5.
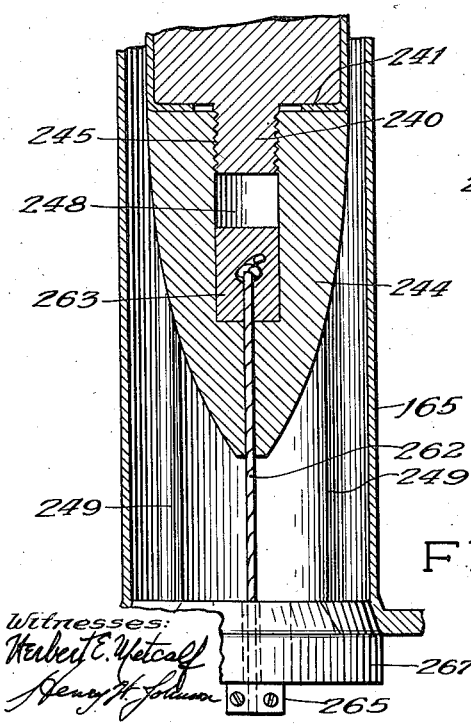
FIG. 4.
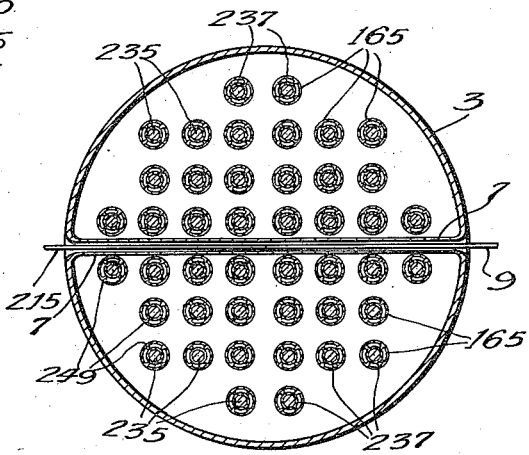
FIG. 6.
Inventor:
Harcourt C. Vernon
By Robert A. Lavender
Attorney.
Witnesses:
Herbert E. Metcalf
Henry H. Johnson March 4, 1958     H. C. VERNON     2,825,688
POWER GENERATING NEUTRONIC REACTOR SYSTEM
Filed Nov. 13, 1945     6 Sheets-Sheet 6

Inventor:
Harcourt C. Vernon

United States Patent Office 2,825,688
Patented Mar. 4, 1958

2,825,688

POWER GENERATING NEUTRONIC REACTOR SYSTEM

Harcourt C. Vernon, Wilmington, Del., assignor to the United States of America as represented by the United States Atomic Energy Commission Application November 13, 1945, Serial No. 628,320

1 Claim. (Cl. 204—193.2)

This invention relates to the development of power and particularly to methods and means for developing power from the nuclear fission of uranium or other material fissionable by neutron capture.

Neutronic reactors from which energy is to be recovered as herein contemplated, generally comprise a fissionable isotope such as $U^{233}$, $U^{235}$ or $94^{239}$ disposed in a neutron slowing material known as a neutron moderator. Carbon, beryllium, and $D_2O$ are typical moderators which may be used. Numerous other moderators including ordinary water are found suitable where enriched compositions containing higher than natural concentrations of fissionable isotopes are utilized. For example, an aqueous solution of Uranyl sulphate containing 5 percent or more of $U^{235}$ by weight of uranium is chain reacting.

In the operation of the reactor, atoms of the fissionable isotope fission due to absorption of thermal neutron with a consequent production of fission fragments of lower atomic weight and further neutrons of high energy known as fast neutrons. In passing through the moderator these neutrons are slowed to thermal energies where they are in thermal equilibrium with the surrounding medium and thereafter the new thermal neutrons are absorbed to cause further fissions, thus continuing the chain reaction.

In order that a self-sustaining neutron chain reaction can be established the reaction must be conducted in a manner such that at least one of the neutrons produced by fission of an atom is available for fission of another atom. Thus neutron losses must be held sufficiently low to permit maintenance of the chain reaction.

In general it may be said that consumption of neutrons evolved during the reaction takes place in the following manner:

(1) For each fission, at least one neutron must be made available for a second fission.

(2) During passage of the neutron through the moderator, some neutrons are absorbed by the moderator.

(3) If non-fissioning isotopes are present either as impurities, controls, coolant or as other components of a reactor including $U^{238}$ or $Th^{232}$, such isotopes will absorb some quantity of neutrons and the amount absorbed will depend largely upon the absorption cross section of the particular isotope which is present.

(4) Since a reactor must be of finite size, some neutrons are lost through leakage.

Frome the above it will be apparent that in order to establish and maintain a chain reaction, the neutron losses listed under 2, 3 and 4 must be held to some minimum so that sufficient neutrons will be available to carry on the reaction. Losses through absorption of neutrons in the moderator may be minimized by proper selection of a moderating material which has a low neutron capture cross section and a high neutron scattering cross section. Losses due to the presence of impurities or other non-fissioning isotopes may be minimized by limiting the quantity of non-fissioning isotope which is present. Where the non-fissioning isotope has a comparatively high cross section for neutrons of energies greater than thermal, but a relatively lower cross section for thermal neutrons as compared to the fissioning cross section of the fissionable isotope (as in the case of $U^{238}$) at the same energies, absorption by the non-fissioning isotope may be be minimized by use of lumps or aggregates of the fissionable isotope-non-fissionable isotope composition.

The loss of neutrons due to a leakage may be compensated for by use of a neutron reflector which reflects neutrons so leaking, or at least a portion thereof, back into the reactor. In general it may be stated that good moderating materials are good reflectors for this purpose. An additional compensation for such leakage may be had simply by constructing the reactor sufficiently large so that the number of neutrons which leave the outside surface are small compared with the total neutrons generated within the reactor.

By proper balancing of the neutron losses in accordance with the above principles, a self-sustaining neutron chain reaction can be established and maintained for a long period of time. Typical reactors and more specific details of the theory and essential characteristics thereof have been described in Fermi et al. Patent No. 2,708,656, dated May 17, 1955, and reference is made thereto.

During the reaction a substantial quantity of energy is released. In accordance with this invention method and means have been provided for recovering the energy released in a nuclear reaction. As herein contemplated a fissionable material is subjected to fission in the presence of or in heat exchange relationship with a vaporisable liquid while maintaining sufficient pressure upon the liquid to prevent substantial boiling from occurring. The liquid is then removed from the reactor at a temperature above its boiling point, pressure upon the liquid is released and a substantial quantity of vapor is formed. Energy in the form of heat and/or power is recovered from the vapor.

Thus it is an object of the present invention to provide a novel method and means for recovering energy released by a nuclear chain reaction.

Another object of the invention is to provide a novel power generating neutronic reaction system.

A further object of the invention is to provide method and means for recovering energy released by neutron fission of a fissionable isotope such as $U^{233}$, $U^{235}$ and/or $94^{239}$.

These and other objects, features and advantages of this invention will become apparent when considered in view of the following description and the accompanying drawings illustrating a typical reactor wherein:

Fig. 4 is a fragmentary view in elevation cross-section of a coated uranium rod and enclosing tube such as used in the structure shown in Fig. 2;

Fig. 5 is a view in cross-section of the uranium rod and enclosing tube shown in Fig. 4 taken along the line 5—5 of Fig. 4.

Fig. 6 is a plan cross-section view of the reactor shown in Fig. 2 taken along the line 6—6 thereof;

The following description will refer to two specific structural embodiments of my invention, one incorporating a fissionable composition such as uranium and heavy water in the form of a slurry and a second wherein the uranium is aggregated in the form of elongated rods immersed in heavy water, the heavy water in both embodiments being heated by the neutronic reactor and flashed into steam at substantially constant pressure.

Figure 1:
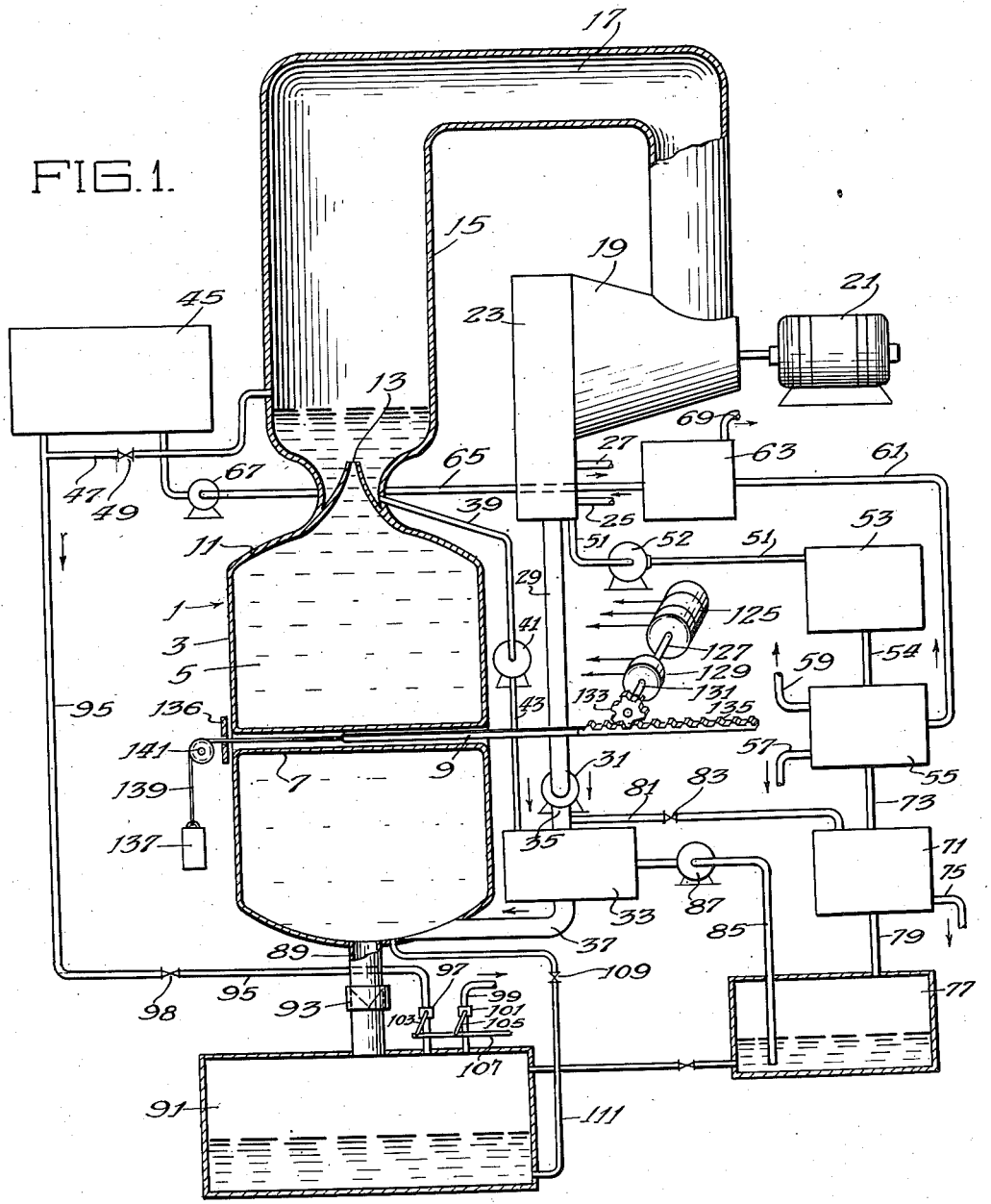
Fig. 1 is a diagrammatic representation of a neutronic reactor and flow diagram of a power generating system showing one embodiment of this invention.

A diagrammatic representation and flow diagram of the first above-mentioned embodiment of my invention is shown in Fig. 1. Referring to this figure the reactor generally designated 1 comprises a stainless steel or aluminum tank 3 enclosing a fissionable suspension or dispersion such as a slurry or solution 5, the tank 3 being provided with a conduit 7 extending transversely therethrough for admitting a control rod 9 to control the neutronic reaction occurring in the slurry or solution 5 as described more fully hereinafter. The reaction tank 3 is provided with a top cover portion 11 that merges into an orifice, nozzle, or other convenient means 13 communicating with an expansion chamber 15. The chamber 15 connects through a relatively large diameter pipe line 17 to a steam turbine 19 designed to drive an electric generator 21. The turbine 19 is associated with a condenser 23 cooled by water introduced through an inlet 25, the cooling water being vented through a diagrammatically illustrated outlet 27. The condensate from the condenser 23 is removed therefrom through a pipe line 29 and pumped by a pump 31 through a pipe line 35 into a slurry or solution mixing tank or tanks and storage reservoir or reservoirs 33 where the concentration of the fissionable suspension is adjusted. Thereafter the slurry or solution is returned to the reaction tank 3 through a line 37 by means of pumping means (not shown) capable of introducing the liquid under pressure into the reactor. Obviously other forms of heat engine may be used instead of the turbine 19 to convert the heat energy in the vapor to mechanical energy.

During the vaporization in the expansion chamber the suspension becomes concentrated. To adjust the concentration the suspension and the solid matter therein are removed from the expansion tank 15 through a line 39, and is forced by a pump 41 through a pipe line 43 to the reservoir 33, whereupon this suspension and solid matter (if any) may be used in preparation of a suspension to be returned to the reactor.

During operation, some of the heavy water moderator is dissociated into deuterium and oxygen and, in addition, some gaseous products may result from the fission process. These gases are diluted in the expansion chamber 15 by admitting helium thereto from a helium supply tank 45 through a pipe line 47 under control of a valve 49. The helium entrains the gases and is swept by the steam developed within the expansion tank 15 through the turbine 19 and condenser 23 and is removed therefrom through a pipe line 51, these gases being pumped by pump 52 into a recombination chamber 53 in which the deuterium and oxygen are recombined to form heavy water vapor by conventional processes.

The process of recombining the deuterium and oxygen forms no specific part of my invention and is not described in particular detail, although recombination of these gases may be obtained by passing them over a hot grid maintained above the recombination temperature of the deuterium and oxygen. Alternatively, the recombination chamber 53 may enclose a platinized charcoal catalytic agent over which the mixed gases are directed for recombination purposes. Upon recombination the dissociated gases form heavy water vapor that is directed along pipe line 54 and condensed in a condenser 55 preferably cooled by a refrigerated medium admitted through the pipe line 57 and removed from the condenser through a line 59. The remaining gases, including the helium originally admitted to the expansion tank 15, are led through a pipe line 61 to a helium purifier 63 the purified gases being led through a pipe line 65 and a pump 67 to the helium supply tank 45. Other gaseous products are removed by the helium purifier 63 and vented through a line 69.

The recombined heavy water vapor following condensation in the condenser 55 is led to a heavy water purifier 71 through a line 73 and is finally delivered. The purifier 71 may comprise any convenient means to remove soluble or entrapped impurities from the heavy water. The purified heavy water is transferred to reservoir 77 through a pipe line 79.

During operation some objectionable contamination of the moderator may tend to occur because of corrosion and/or accumulation of fission products or for other reasons. Purification may be accomplished by bleeding off some of the condensate from the pipe line 35 and/or some of the moderator or solution from the reactor by means not shown. The moderator so bled off may be delivered to the purification system 71 where it may be purified by distillation or other convenient method and delivered to the reservoirs 77. The heavy water may be delivered from the reservoir 77 to the mixing system 33 through a pipe line 85 by a pump 87.

The bottom of the reaction tank 3 is provided with one or more outlets, only one being shown at 89, leading to a reservoir 91 through a check valve 93. Check valve 93 is designed to retain the suspension 5 within the reaction tank when the reservoir is under higher pressure than that maintained within the reaction tank 3. Thus, during operation, the dispersion within the reaction tank is maintained at a relatively high pressure, such as 225 pounds per square inch by operation of the reactor at a sufficiently high temperature, limiting the escape of suspension through the orifice 13 or other limited capacity outlet and supplying the liquid to the reactor under the required pressure. The check valve 93 is designed to open when the pressure in the reservoir 91 falls to a predetermined lower value. During operation of the reactor, a pressure is maintained in the reservoir 91 by admitting helium through a supply line 95 and valve 97. The pressure may be adjusted to be higher than the normal pressure in the reaction tank 3 by a pressure regulating valve 98 in the line 95. An exhaust line 99 including a valve 101 is likewise connected to the slurry reservoir to reduce the pressure therein under adverse operating conditions, the valves 97 and 101 having valve arms 103 and 105 connected to a common actuating lever 107 so that when the valve 97 is opened admitting helium to the reservoir 91, the valve 101 is closed, and conversely when the valve 101 is opened, venting the helium from the reservoir, the valve 97 is closed to prevent waste of helium gas.

Maintenance of an elevated pressure within reservoir 91 during operation of the neutronic reaction system is convenient in providing rapid dumping of the suspension 5 from the reaction tank 3 in the event of abnormal conditions arising during operation.

The critical size of the reactor is that size for which the reproduction ratio R of the reactor is unity. At this critical size the neutron losses including leakage loss balance the neutron gain by fission of the $U^{235}$ or other fissionable isotope. However, it is inconvenient to provide a reactor of variable size and it is therefore desirable to provide the reactor 1 somewhat larger than critical size and provide a neutron absorber, such as the neutron absorbing control rod 9 that may be inserted within the neutron field of the reactor to a varying degree. The effect of the control rod is to increase the neutron losses in the system and provide means for varying the losses so that a balance may be maintained. The operation of the control rod is referred to more fully hereinafter. However, if for some reason the neutrons available for producing new fission exceed the neutron losses, the neutron density will rise exponentially with time and a condition may arise at which the heat dissipating capacity is insufficient for adequate heat removal. It is therefore desirable to provide means to remove the suspension rapidly from the reaction tank. Consequently, upon movement of the actuating lever 107 closing valve 97 and opening valve 101 the reservoir 91 is opened to the atmosphere causing loss of pressure therein, opening of the check valve 93, and thereby producing rapid dumping of the suspension into the reservoir 91. The suspension may be removed from the reservoir 91 by again establishing pressure within the reservoir and opening valve 109 in by-pass line 111 connecting the reservoir 91 and the reaction tank 1.

The control rod 9 is preferably of cadmium or other material highly absorbent to neutrons. The conduit 7 (Fig. 8) extending through the reaction tank 3 is made of neutron permeable material such as stainless steel so that the neutrons penetrating therethrough are intercepted by the control rod 9 for any given positioning within the conduit 7 thereby absorbing neutrons from the reactor. The control rod 9 may be adjusted longitudinally of the conduit 7 exposing more or less of its length for neutron absorption in a number of different ways, although I have shown an electric motor 125 operating through shaft 127 and magnetic clutch 129 for varying the position of the control rod 9. The magnetic clutch 129, when energized, locks the shaft 127 to a second shaft 131 carrying a pinion 133 that engages a rack 135 attached to the control rod 9. Rotation of the pinion 133 drives the control rod inwardly or outwardly of the reactor. This portion of the system is arranged so that should there be any power failure, the magnetic clutch is released, and the control rod is immediately drawn within the reactor against a stop 136 by a weight 137 connected through a flexible line 139 over a pulley 141 to the control rod 9.

A further embodiment of the invention incorporates the uranium in massive form. For example, instead of utilizing the uranium in finely divided form as a constituent of a slurry with heavy water ($D_2O$), the uranium may be in the form of rods, tubes, spheres, cubes or other shaped members immersed in the heavy water. A flow diagram of such a system has been shown in Fig. 2, wherein the uranium is in the form of coated rods supported in tubes in contact with and surrounded by the heavy water moderator.

Figure 2:
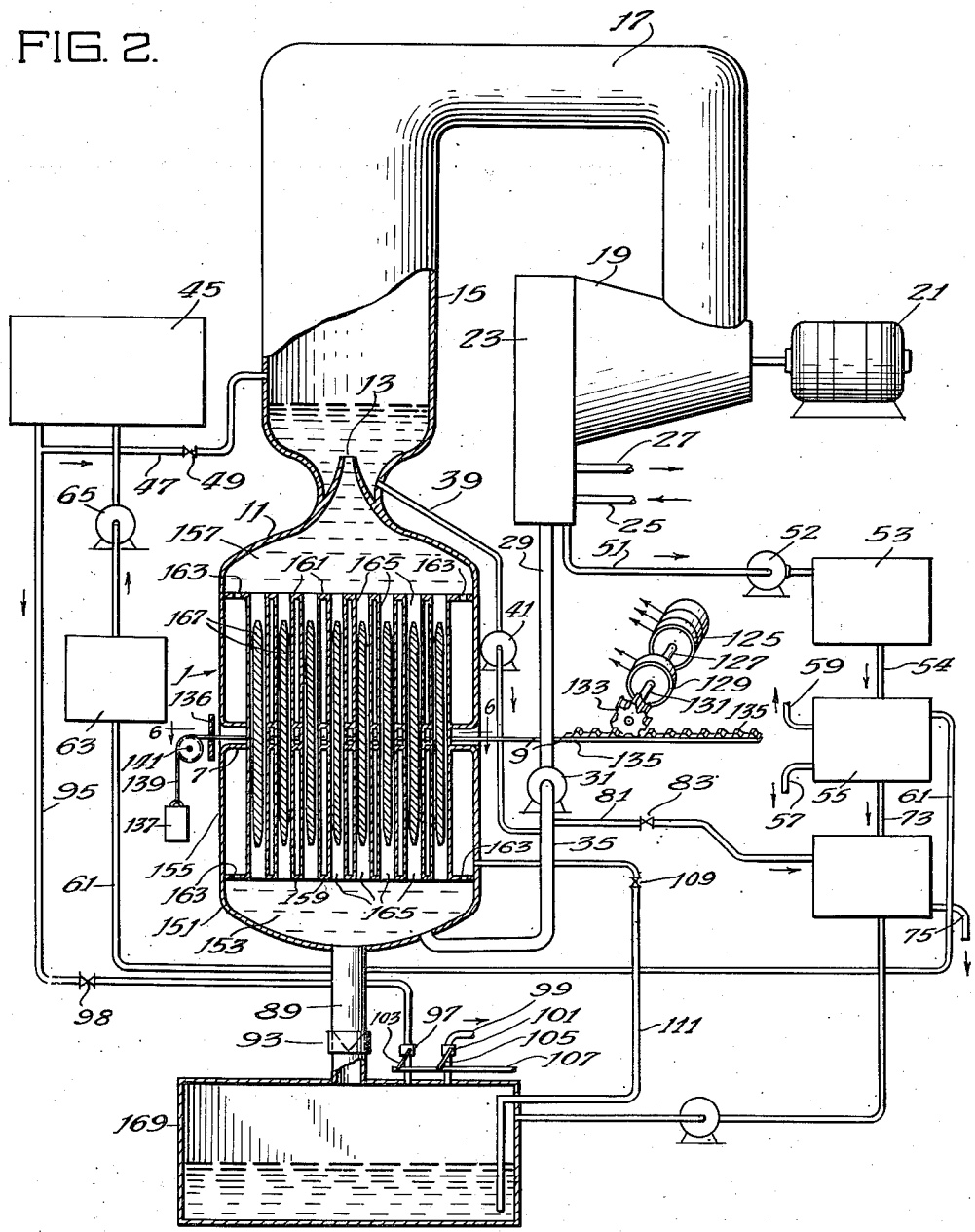
Fig. 2 is a diagrammatic representation and flow diagram similar to that of Fig. 1 showing a further embodiment of the invention.

In general, the system diagrammatically shown in Fig. 2 is similar to that of Fig. 1 except that certain modifications resulting from the use of the uranium in the form of aggregates are incorporated in the system. Referring to Fig. 2, wherein apparatus previously described is similarly referenced, the reactor 1 is divided into three compartments, a lower portion 151 filled with heavy water 153, a central portion 155 and an upper portion 157 likewise filled with heavy water being surmounted by the orifice 13 as previously described in connection with Fig. 1. The central portion 155 is separated from the lower and upper portions by baffles 159 and 161 having apertures 163 around the periphery of the baffles for small quantity flow of heavy water from the lower portion 151 to the upper portion 157 of the reactor. The upper and lower baffles are pierced by a plurality of tubes 165 enclosing coated uranium rods 167. The coating and means for supporting these rods within the tubes 165 is described hereinafter in connection with Figs. 4 and 5. The spacing between the rods 167 and tubes 165 is so designed that high velocity heavy water flow is provided in contact with the coated uranium rods to carry away the heat developed therein during the fission process. Some heat may be transferred through the tubes 165 to the heavy water surrounding the tubes, the apertures 163 in the baffles 159 and 161 being of sufficient number and cross-sectional area to provide a gradual displacement of the heated heavy water from the central portion 155 of the reactor to the upper portion 157 by the heavy water in the lower portion 151. However, the number and area of the apertures 163 is limited so that the majority of the heavy water flowing through the reactor is forced through the tubes 165 in contact with the uranium rods 167 inasmuch as the heat developed in the uranium is transferred to the heavy water in accordance with the velocity of water flow.

The central portion of the reactor is pierced by the conduit 7 admitting the control rod 9 for purposes of neutron control as described in connection with Fig. 1 and more fully hereinafter.

Moderator reservoir 169 is shown as located directly beneath the reactor 1 with the outlet line 89 and check valve 93 communicating therebetween. In operation, the liquid moderator from the reservoir 169 is admitted to the reactor 1 filling the lower, central, and upper portions thereof while the control rod 9 is fully inserted within the conduit 7. The neutronic reaction in the reactor is then initiated as fully described below and the heavy water heated and forced into the expansion tank 15, the heavy water being circulated through the pipe line 39 and pump 41, this heavy water being forced upwardly through the tubes 165 and over the uranium rods 167 for efficient heat transfer from the rods to the heavy water. The circulation is continued until the heavy water is heated sufficiently to establish a super-atmospheric pressure in the reactor and to flash a portion thereof into steam within the expansion chamber 15. Following passage through the turbine to develop power, the steam is condensed in the condenser 23 and the condensate returned through the line 29 by the pump 31 to the lower portion 15 of the reactor whereupon the process is repeated.

Boiling of the moderator within the reaction tank 3 causes a change in the ratio of heavy water to the uranium or a change in the volume of reacting suspension and as shown more fully hereinafter, such reduction in this ratio may result in a substantial change of the neutron reproduction ratio. It is preferred to prevent substantial boiling of the heavy water within the reaction tank by maintaining the heavy water therein under pressure exceeding that pressure at which the heavy water would boil. The pressure of the heavy water within the reaction tank 3 is maintained by designing the restricting orifice 13 in accordance with the quantity of heavy water or slurry introduced into the reaction tank through the pipe line 37 Fig. 1 or pipe line 35 Fig. 2. This pressure is preferably of the order of 225 pounds per square inch and it is preferred to enclose the reaction tank 3 with an auxiliary pressure tank designed to withstand such pressure rather than to retain the pressure by heavy construction of the reaction tank. Thus the reaction tank is preferably of relatively thin stainless steel to facilitate return of neutrons normally escaping from the reaction tank.

Figure 3:
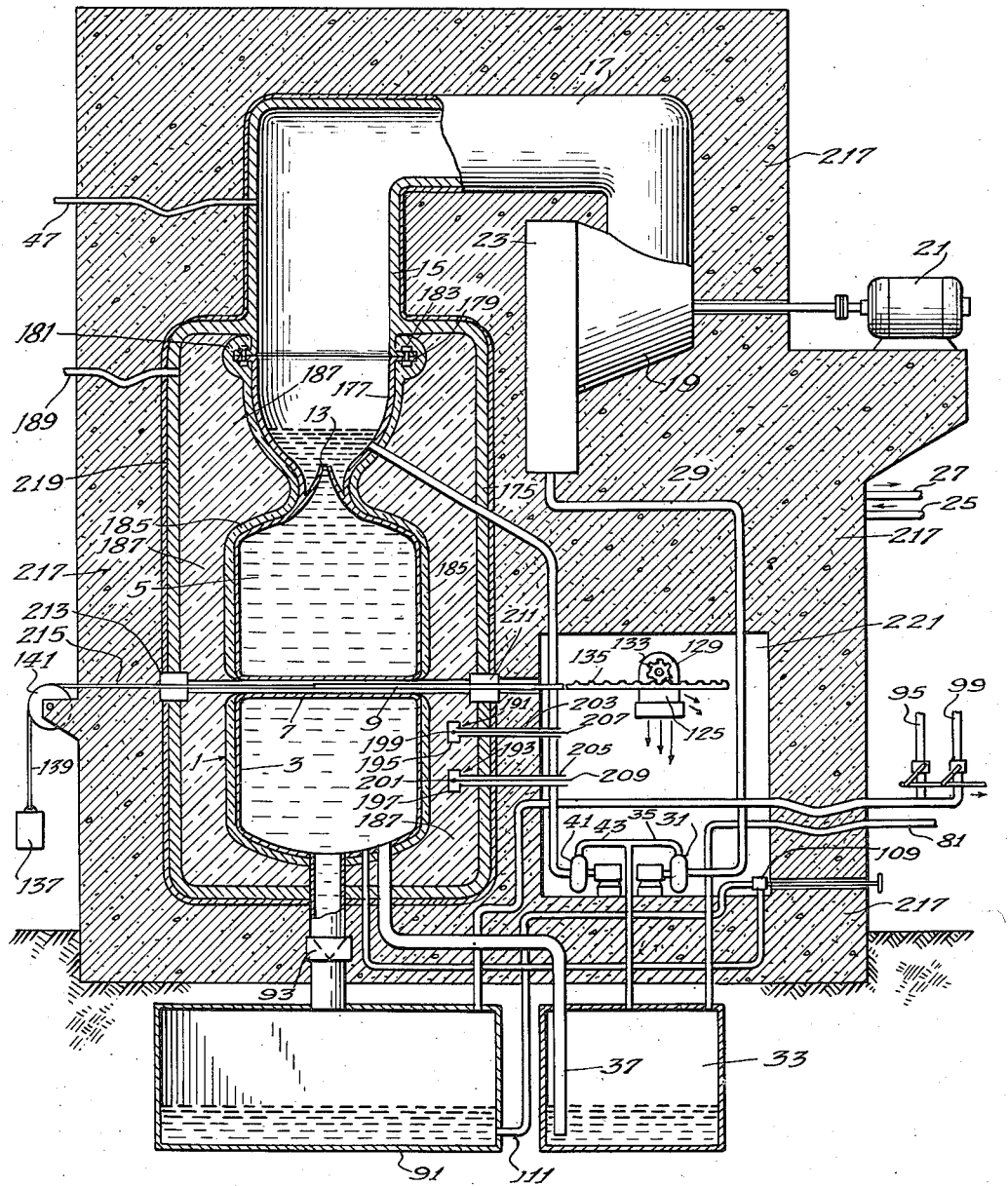
Fig. 3 is an elevation view partly in cross-section of a neutronic reactor and certain associated equipment for developing power from a neutronic reaction.

Referring to Fig. 3, wherein structure previously described is similarly referenced, the reaction tank 3 as well as a portion of the expansion chamber 15 is enclosed within a pressure tank 175. More particularly, the portion of the expansion chamber 15 adjacent the reaction tank 3 is formed integrally therewith, this portion being shown at 177. The portion 177 is flared inwardly from the large diameter expansion chamber 15 adjacent the reaction tank 3 in the region of the orifice 13 and joined integrally to the reaction tank. The upper edge of the expansion chamber portion 177 is flanged outwardly as shown at 179. The wall of the expansion chamber 15 is likewise provided with a flange 181 and is joined to the flange 177 such as by bolts 183 extending through and spaced peripherally about the flanges.

The loss of neutrons and heat from the lateral surfaces of the reaction tank should be limited to a low value. Since the temperature of the reaction tank is equal to or exceeds the temperature at which the heavy water flashes into steam in the vaporization chamber 15, it is desirable to provide insulation 185 surrounding the reaction tank 3 and the lower portion 177 of the vaporization chamber 15. The material comprising the insulation 185 is preferably a low neutron absorber and have a high scattering cross section such that the neutron losses therein are low and also that the scattering effect for neutrons is relatively high. Insulation 185 may therefore comprise material such as beryllium oxide, aluminum oxide or other material having these desired properties.

To further conserve neutrons flowing through the reaction tank, the reaction tank 3 and insulation 185 is enclosed by a neutron reflecting material forming a neutron reflector 187. The neutron reflector may comprise carbon in the form of graphite blocks of high density which may be fitted between the reaction tank and the pressure tank 175 during construction thereof. The graphite is preferably of high purity to prevent material absorption of neutrons. As indicated above, the graphite is preferably provided in the form of bricks that may be fitted snugly around the insulated reaction tank. With such construction it is feasible to maintain the entire volume within the pressure tank 175 under gaseous high pressure, substantially equalizing the pressure exerted on the inner surface of the reaction tank 3. This equalizing pressure is developed by introduction of helium or other low neutron absorbing fluid such as through a pipe line 189 supplied with helium gas from the helium supply tank 45, previously referred to.

The neutron density within the reflector 187 is proportional to the neutron density within the reactor 1, and this later neutron density may be used to control the former. Consequently, neutron density indicating means, such as one or more ionization chambers responsive to neutrons passing through the reaction tank 3 and into the graphite reflector, is provided in the reflector. Referring again to Fig. 3, two ionization chambers 191 and 193 are imbedded in the graphite reflector closely adjacent the reactor 1. The ionization chambers comprise metal casings 195 and 197 each enclosing a quantity of boron fluoride and each having an insulated electrode 199 and 201 leading through a shield conduit 203 and 205 by conductor lines 207 and 209. The use of such ionization chambers is well known in the art of neutron detection and particular constructional details need not be given, although I refer hereinafter to the circuit in which the ionization chambers 191 and 193 are utilized for control of the normal neutron density within the reactor, and for emergency control of the system with respect to abnormally high neutron densities occurring therein.

The remaining structure associated with the reactor of Fig. 3 is similar to that described in connection with the dispersion system of Fig. 1, except that means are provided for leading the control rod 9 through the pressure tank 175 for neutron density control of the reactor. Inasmuch as the control rod 9 must be free to move within the conduit 7, to vary the neutron density within the reactor, I provide a bushing 211 in the pressure tank 175 opposite the conduit 7 so designed as to snugly enclose the control rod 9 so that the rod may freely slip therethrough without loss of helium pressure within the pressure tank. On the opposite side of the pressure tank from the bushing 111 and in alignment with the conduit 7, I provide a second bushing 213 slidably engaging a pull rod 215 attached to the end of the control rod 9 opposite that connected with the rack 135. The bushing 213 is likewise designed to maintain pressure within pressure tank 175 notwithstanding the sliding contact with the pull rod 215 which in turn, is connected to the flexible member 139 which passes over the pulley 141 to the weight 137 utilized for pulling the control rod fully within the reactor for terminating the neutronic reaction in case of abnormal operating conditions.

The entire apparatus including the pressure tank 175, the reactor 1, the vaporization chamber 15, conduit 17, turbine 19 and condenser 23 are enclosed within a neutron and gamma ray shield 217 that completely encloses these component parts of the system. Such a shield is desirable to protect operating personnel from high velocity neutrons permeating the reaction tank and pressure tank as well as from gamma rays liberated by radioactive decay of the products formed by the neutronic reaction. The shield 217 is preferably composed of concrete at least five feet in thickness. The water of crystallization of concrete is effective in absorbing the energy of neutrons escaping through the reflector 187 by collision of neutrons with the hydrogen of the water, and the concrete being relatively dense is effective in absorbing gamma radiation. To offer further protection against gamma radiation the pressure tank 175 is covered with a layer of lead sheathing 219 to a thickness of approximately four inches.

The concrete shield 217 may be provided with a chamber 221 therein, enclosing the motor 125 for moving the control rod 9 within the reactor, as well as the auxiliary pumps and associated driving motors and conduits previously described in connection with Figs. 1 and 2, it being noted that the auxiliary equipment shown in Fig. 3 is similar to that shown in Fig. 1 as associated with a reactor containing the fissionable material as a slurry constituent.

The uranium rods 167 for use in a reactor of the type shown in Fig. 2, and wherein the uranium is provided in massive form are preferably provided with a sheath of a material having low neutron absorption characteristics such as stainless steel, aluminum or beryllium to protect the uranium against oxidation and to prevent the fission products, formed in the uranium during the neutronic reaction, passing into the heavy water flowing through the tubes 165. Referring to Figs. 4 and 5, I have shown one of the rods 167 supported within one of the metal tubes 165 from either end thereof. The rod 167 is preferably formed of a mass 235 of fissionable material of cylindrical form, the cylindrical surface thereof being covered with a stainless steel or aluminum sheathing or coating 237. The upper and lower ends of the uranium are undercut and threaded as shown at 239 and 240, respectively, the coating 237 being flanged at 241 over the ends of the uranium into close proximity with the threaded portions. Correspondingly threaded end caps 243 and 244, each provided with a central recess 247 and 248, is then turned into snug engagement with the flanged portions 241 of the coating 237 to form the rod assembly previously designated 167 in the drawings.

The entire assembly comprising the coated uranium 235 and the caps 243 and 244 is supported within the tube 165 and spaced therefrom by ribs 249 formed integrally with the tube 165 leaving an annular space 250 between the coated uranium and the tube 165 for flow of the heavy water or slurry upwardly of the tube.

As one suitable method of supporting the rod assembly just described, I provide a grommet 251 seated on the upper end of the tube 165, the grommet being provided with apertures 253 through which the heavy water or slurry may flow. The rod assembly 167 is supported by the grommet 251 through a cable 255 passing through the end cap 243 into the recess 247. The lower end of the cable 255 is fixed within the recess 247 by embedding the cable end in a mass of molten aluminum which, after solidification, forms a plug 257 retaining the cable in fixed relation with the end cap 243. The upper end of the cable 255 is fixed with respect to the grommet 251 by a clamp 259 which surrounds the cable and is clamped thereto such as by bolts 261.

During operation, the flow of heavy water through the tubes 165 has a tendency to lift the coated rods and I therefore prefer to secure each of the uranium rods within the tubes 167 by similar means such as by a hold-down cable 262 having one end embedded within aluminum 263 partially filling the recess 248 in the end cap 244, the opposite end of the cable 262 being held by a clamp 265 engaging the lower surface of a grommet 267 similar in form to the grommet 251. The positioning of the uranium rods 167 throughout the reaction tank 3, is best shown in Fig. 6. Although the full number of uranium rods 167 is not shown in Fig. 6, this figure is representative of the distribution of the rods within the reaction tank. It will be noted that the rods are uniformly spaced and for the preferred structure, further data thereon being given below, the rods are arranged in a square lattice with uniform center to center distances.

I have also shown in Fig. 6, the position of the conduit 7 enclosing the control rod 9 as passing through the approximate center of the reactor. It is desirable to provide the control rod within a portion of the reactor having a high neutron density inasmuch as the presence of the control rod in this portion of the reactor tends to decrease the neutron density over this portion of the reactor and thereby effectively limit the maximum neutron density. For example, the neutron density at the center of the reactor is considerably higher than adjacent the periphery of the reactor, and location of the control rod in this region renders the control rod more effective in controlling the neutron density within the reactor. In addition, the neutron density is decreased somewhat over the central portion of the reactor thereby reducing the differential heating effect produced across the reactor.

It will be understood that the structure and type of reactors herein described are purely illustrative and that the invention is not confined to application in connection with any particular reactor. For example, the invention may be used in connection with a carbon moderated reactor wherein a coolant such as water may be passed in heat exchange relationship with the fissionable bodies while maintaining the pressure sufficiently high to prevent boiling in the reaction zone and subsequently flashing vapor therefrom after the coolant has been removed from the reaction zone.

As previously noted, typical neutronic reactors which may be used in connection with the present invention have been described in great detail in the above mentioned application of Enrico Fermi and Leo Szilard. Typical reactors wherein the reacting mixture comprises an aqueous or $D_2O$ solution of fissionable isotope such as the sulphate, fluoride, or nitrate of uranyl $U^{235}$ or $U^{233}$ have been described by Robert F. Christy in his application for U. S. Letters Patent Serial No. 623,363, filed October 19, 1945. Typical reactors involving the use of a slurry of $UO_2$, $U_3O_8$ or similar body in $D_2O$ are described more in detail in an application for U. S. Letters Patent Serial No. 613,356, filed August 29, 1945 by Eugene P. Wigner, Leo A. Ohlinger, Gale J. Young and Alvin M. Weinberg. Reference is made to the above applications for further specific details regarding the construction and operation of a neutronic reactor.

The following tabulation gives approximate dimensions and weights that may be used as a guide for construction of a neutronic reaction system as herein described wherein natural uranium is used in the form of aluminum coated rods spaced one from another in the heavy water moderator in a square lattice arrangement:

| | |
|---|---|
| Number of uranium rods 167 | 234 |
| Length of uranium rods _____feet__ | 8 |
| Diameter of uranium rods _____cm__ | 2.8 |
| Weight of uranium in rods ____metric tons__ | 6.5 |
| Spacing center to center of rods ____inches__ | 5⅜ |
| Aluminum coating 237 thickness (2-S commercial purity) _____mm__ | 3.0 |
| Aluminum tube 165 wall thickness (2-S commercial purity) _____mm__ | 3.0 |
| Cooling annulus 259 _____cm__ | 1.5 |
| Reaction tank 3 in diameter _____feet__ | 9 |
| Reaction tank 3 height _____do__ | 10 |
| Approximate heavy water weight in reactor__tons__ | 15.5 |
| Approximate graphite reflector thickness__inches__ | 18 |
| Graphite approximate weight _____metric tons__ | 70 |

The above data are exemplary only and neutronic apparatus made and operated in accordance with the invention is not limited to the specific details set forth in this data. For example, the length, diameter, number and spacing of the uranium rods may be varied over wide limits and the ultimate construction depends to a substantial degree upon the purity of the components and the reflecting character of the reflector. The coating and tube wall thickness are determined in accordance with the rate of erosion of aluminum when exposed to the heavy water flow through the reactor. For high velocity flow these thicknesses may be made greater although use of greater quantities of aluminum within the reactor reduces the reproduction factor because of the finite neutron capture characteristics of the aluminum and any impurities therein.

A reactor built in accordance with the above tabulated data provides an excess reproduction ratio over unity which upon continued operation of the reactor may become lower because of impurities abraded from the heavy water circulating system. Thus while I have shown only one control rod, additional limiting rods of cadmium or other material highly absorbent to neutrons may be inserted into the reactor through additional conduits similar to the conduit 7. Thus a dangerous condition in structures wherein the reproduction ratio greatly exceeds unity may exist, as appears more fully hereinafter upon consideration of the effect of delayed neutron emission in the fission process, and where such excess in reproduction ratio exists, it is desirable to use additional neutron absorbing members to limit the rise in neutron activity within controllable rates.

The nuclear chain reaction within the reaction tank 1 is dependent upon the nuclear fission of the fissionable constituent when subjected to thermal neutrons. During the fission process fast neutrons are emitted by the uranium and these fast neutrons are slowed to thermal energy. However, whether the uranium or other fissionable body is used in a slurry, solution or in massive form, there must be sufficient uranium to intercept the neutrons once they have reached thermal energy. Consequently, the ratio of uranium atoms to the atoms of the moderator producing the slowing effect must be such that the slowing is sufficient, the availability of uranium in the paths of the slow neutrons is adequate, and the neutron loss occasioned by resonance capture is insufficient to overcome the neutron gain occasioned by the fission process, so that a self-sustaining chain reaction is possible.

Figure 7:
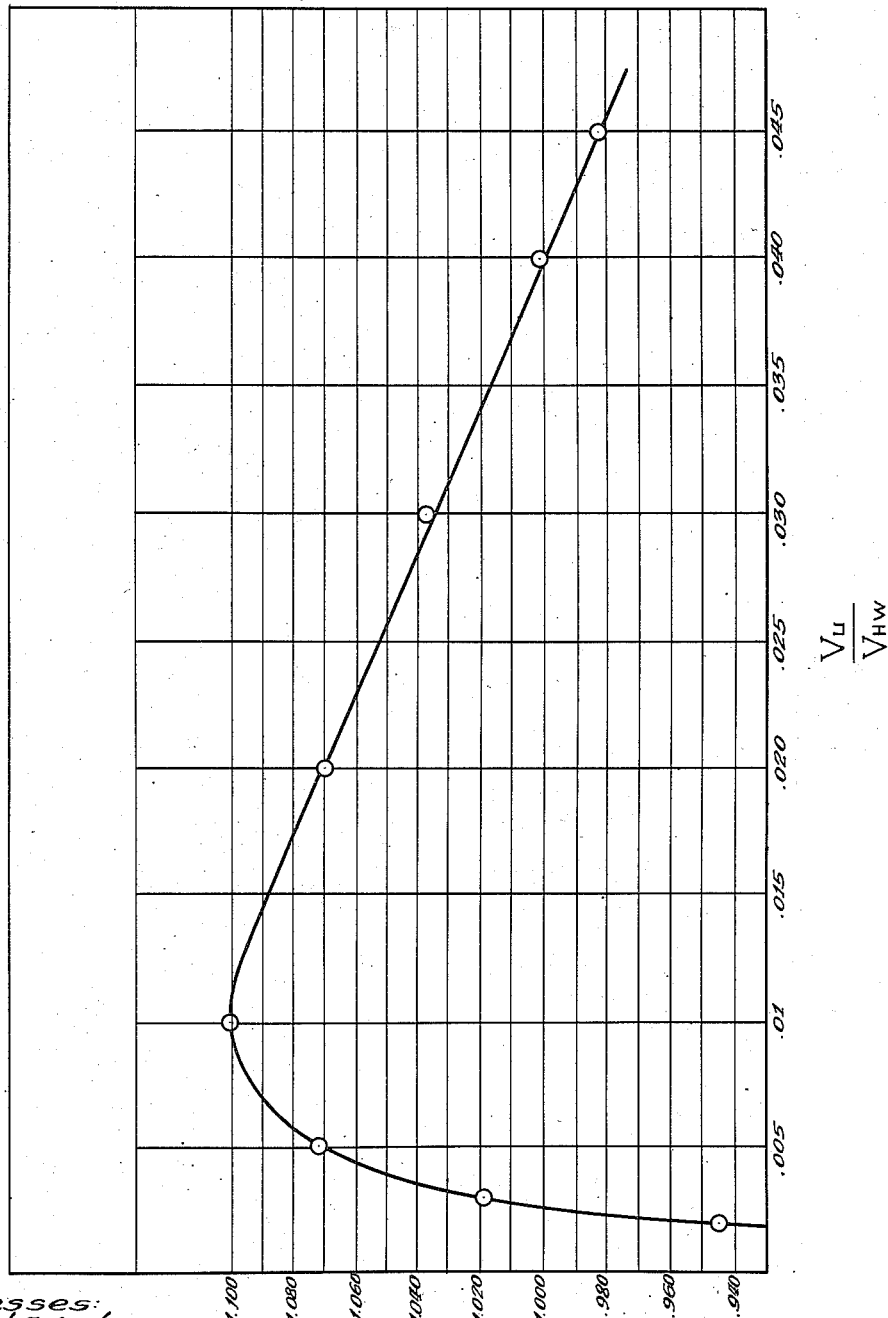
Fig. 7 is a graph showing reproduction ratios plotted as ordinates and uranium to moderator volume ratios plotted as abscissae.

The curve shown in Fig. 7 has been drawn for a moderator of heavy water of a purity based on an absorption cross-section of $0.004 \times 10^{-24}$ cm.$^2$, the ordinates representing values of reproduction factor K, the abscissae being various ratios of uranium atoms to heavy water molecules. This ratio may be termed the volume ratio of uranium to heavy water and the computed values are based on the fact that K is proportional to the product of three factors: $p$, $f$, and $\epsilon$, where $p$ is the probability of a fast fission neutron escaping resonance capture and becoming a thermal neutron capable of creating new fission; $f$ is the fraction of the thermal neutrons absorbed by the uranium rather than by the heavy water; and $\epsilon$ is the value of the additional neutrons due to fission produced by the fast fission neutrons before being slowed to thermal energy.

The uranium resonance capture is somewhat lower for aggregated uranium than for finely divided uranium such as used as a slurry constituent and consequently the value of K is somewhat larger in a system incorporating uranium rods as in Fig. 2 than in the slurry system of Fig. 1. The curve in Fig. 7 is approximately representative of a slurry system whereas a corresponding curve for uranium in massive form would be similar although having a somewhat higher maximum reproduction factor value.

From the curve of Fig. 7 it will be appreciated that as the ratio of uranium to the heavy water is increased the value of K increases from values below unity and reaches a peak of 1.10 at a concentration of about 0.01 atom of uranium per molecule of heavy water. Since the system will operate equally as well, with respect to uranium concentration with a reproduction factor slightly over unity for a high and low concentration of uranium, and since uranium is at present cheaper to produce than heavy water, the volume ratio used is preferably in the higher range such as about 0.023 atoms of uranium per molecule of heavy water.

When using the system of Fig. 1 incorporating a slurry and neglecting the very low danger coefficients of oxygen content of the uranium oxide ($UO_2$) preferably used, a K factor of about 1.060 is obtained. When using $UO_2$ as the uranium source this corresponds to approximately one part oxide to four parts heavy water by weight. On a volume basis, the oxide solids represent about 4 percent of the slurry volume.

The particle size of the uranium oxide for a slurry is preferably below 2 microns ($\mu$). This size of the individual particles is dictated principally by the abrading action of the particles on the valves and walls of the reactor. For larger particle sizes erosion may be excessive. While erosion does not materially affect the mechanical operation of the system, it tends to poison the system by the inclusion of iron and other metals worn from the objects with which it comes in contact.

Theoretically, the size and distribution of the uranous particles in the slurry affect the value of the reproduction factor K because the resonance loss increases with decrease in particle size. Thus for a given ratio of uranium volume to total slurry volume the value of K will vary, increasing to a maximum and then decreasing with decrease in particle size. This effect has no practical importance, however, in a slurry system, because the size range is without the limits imposed by circulation of the slurry. For example, to provide an optimum reproduction factor the particles would have to be one centimeter or larger in diameter. However, as indicated above, the slight loss in neutrons due to the small particle size of the uranous material is more than compensated by the low neutron loss of the moderator.

The structural form of the reaction tank may be of any desired shape such as a sphere, a cylinder, a parallelepiped, or combination thereof, as long as the mass thereof is sufficient and is concentrated to reduce surface losses within the confines as dictated by the maximum reproduction factor. Thus while I have shown a cylindrical reaction tank in the drawings, other forms as indicated above may be used. For a slurry system and a cylindrical tank and for a minimum size and consequent savings in heavy water, it may be desirable to provide a slurry concentration providing the highest practical reproduction factor.

Prior to filling the reaction tank with the slurry or the heavy water it is imperative that the control rod 9 be inserted fully within the conduit 7 extending through the reaction tank to prevent initiation of the neutronic reaction. The function of the control rod in this position is to limit the neutrons to an amount insufficient to initiate the reaction by absorption of these neutrons. However, the action of the control rod should not to be likened unto a throttle action. The effective critical size of the reactor is reached at a point in the withdrawal of the control rod at which the number of neutrons developed by fission and available for sustaining the neutronic reaction equals the number of neutrons lost by absorption in the uranium metal or compound, by absorption in the heavy water moderator, by absorption in impurities present in the system, including absorption in the control rod and by leakage from the system. For this position of the control rod the reproduction ratio of the system is exactly unity. When this condition is reached, further withdrawal of the control rod causes an increase in the reproduction ratio to a value over unity and the reaction is initiated. The neutron density will then continue to increase exponentially with time and it is necessary to insert the control rod to a position at which the reproduction ratio is less than unity to decrease the neutron density. The amount the control rod is withdrawn beyond conditions representing unity reproduction ratio determines the time of doubling of the neutron density but does not determine the maximum density reached, this being a function of both reproduction ratio and time following increase in reproduction ratio over unity. This action will be referred to later in connection with an explanation of delayed neutron emission following fission of the uranium nucleus.

Figure 8:
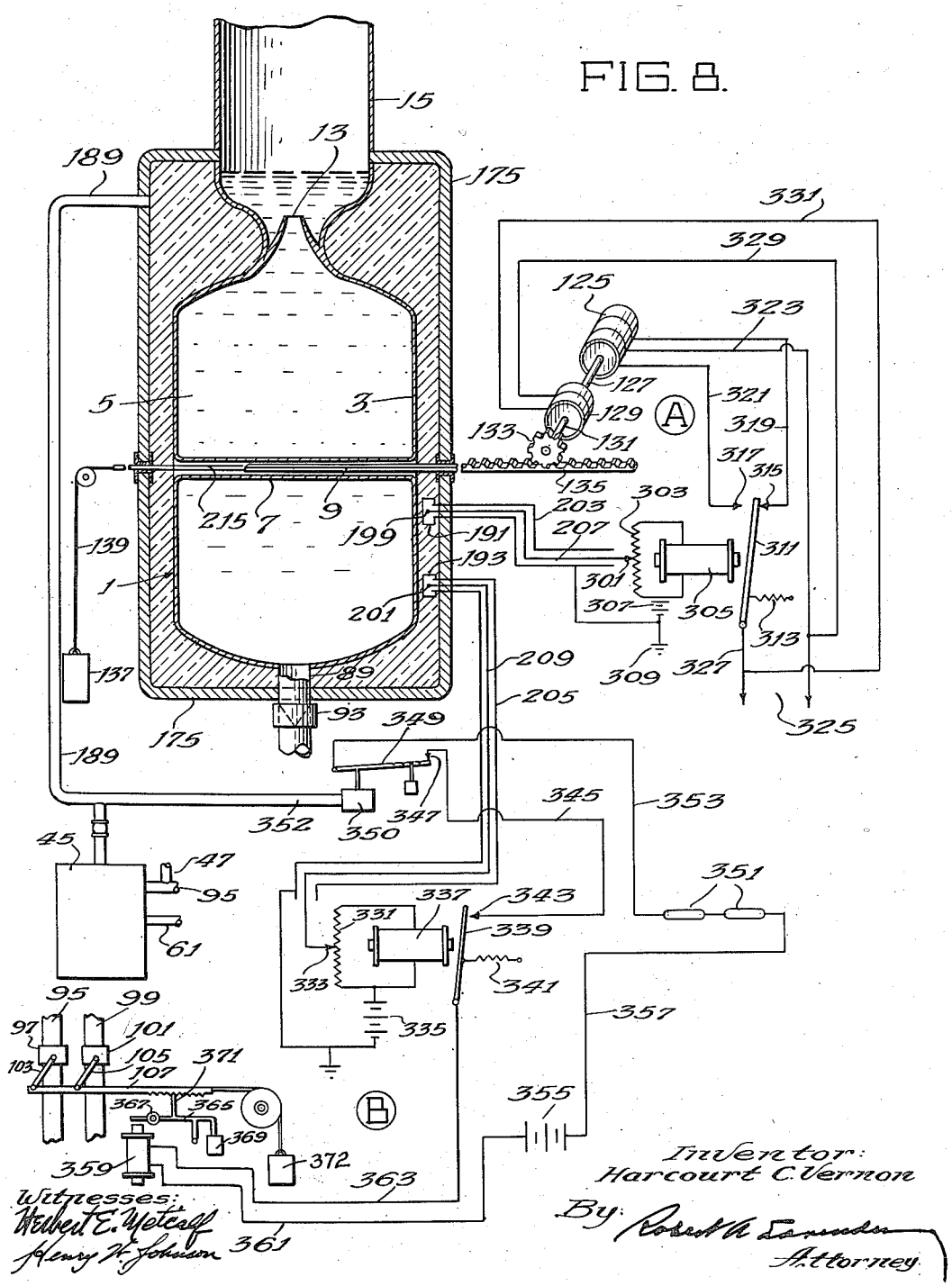
Fig. 8 is a circuit diagram of a control circuit useful in controlling neutronic apparatus made and operated in accordance with the present invention.

Reference is made to Fig. 8 which shows diagrammatically one form of control and safety circuit which may be used for regulating the neutron density and power output of the system. Referring first to control circuit A, the control ionization chamber 191 referred to above as being placed adjacent the reaction tank 1, is provided with a filling of boron fluoride. The central electrode 199 within the chamber 191 is connected to the wire 207 leading outside of the system enclosed by the concrete shield 217 (shown in Fig. 3), through the shielding conduit 203 to a movable slider contact 301 on a resistor 303. Resistor 303 is connected across a relay coil 305, one side of which is connected to a battery 307, the other of which is connected to the shielding conduit 203 around the wire 207. The shield 203 is grounded preferably externally of the concrete shield as shown at 309. The reaction tank 3 is permeable to neutrons developed therein and alpha ray ionization due to neutron reaction with the boron within the chamber 191 is proportional to the neutron density. Thus the current in resistor 303 varies in accordance with the neutron intensity reaching the ionization chamber. Relay coil 305 operates a relay armature 311 which is spring biased by spring 313 to engage one motor-control contact 315, and is urged by current in the relay coil 305 to engage a second motor control contact 317.

The contacts 315 and 317 are connected to the reversible motor 125 previously referred to, through conductors 319 and 321, the motor having a return line 323 leading to one side of a power supply source 325, the armature 311 being connected to the other side of the power source through a conductor 327. The magnetic clutch 129 connecting motor shaft 127 with the pinion 133 on shaft 131 is likewise connected to the power supply source 325 through conductors 329 and 331 so that in the case of power failure the rack 135 engaging pinion 133 and the control rod are drawn by the weight 137 to a fully inserted position for the control rod.

The response of the ionization chamber 191 to variable neutron density produced by the reactor may be calibrated in advance of normal operation of the reactor and the slider contact 301 is then set in advance corresponding to the desired maximum neutron density at which the system is to operate. While the ionization chamber does not indicate directly the maximum neutron density within the reaction tank the ratio of maximum to measured density is a known ratio for all operating neutron densities within the reaction tank 3. For an inserted position of the control rod at which the reproduction ratio is less than unity the neutron density is much lower than the desired maximum neutron density and the relay coil 305 will not receive enough current to operate the armature 311 since very little ionization takes place within the ionization chamber 191. Consequently, the armature 311 will rest against the contact 315 driving the motor 125 in a direction withdrawing the control rod. However, as the control rod is withdrawn and the condition is reached at which the neutron reproduction ratio is greater than unity, the neutron density will rise until the ionization in the chamber 191 becomes so great that at the maximum desired neutron density the armature 311 is drawn into rest with the motor contact 317. The motor will then drive the control rod inwardly of the reactor unit the ionization in the chamber 191 is insufficient to hold the armature 311 against the contact 317, releasing the armature and reversing the motor 125 by energizing the motor through contact 315 and conductor 319. The control rod will thereafter hunt between upper and lower limits on either side of a control rod position corresponding to the effective critical size of the reaction system. Thus the control rod will move between a point above the balance position at which the neutron density rises exponentially and a point below the balance position where the neutron density decays, providing an average neutron density within the reaction tank as determined by the setting of the sliding contact 301 on the resistor 303. As the mass of the heavy water or slurry in the reaction tank causes any temperature change to lag behind any neutron density change, the temperature of the heavy water or slurry is maintained substantially constant. If desired, any of the well-known anti-hunting circuits may be utilized as will be apparent to those skilled in the art.

Due to the fact that it might be possible for the control circuit as described to fail, and thereby leave the control rod in such a position that the neutron density would continue to rise indefinitely, a safety circuit may be provided which may be brought into action either manually in response to abnormal operating conditions or automatically in response to neutron densities within the reactor exceeding the redetermined setting of the sliding contact 301 on the resistor 303.

Thus there is provided an additional ionization chamber 193 corresponding in construction and positioning to the chamber 191. As previously described in connection with a Fig. 3, the ionization chamber 193 is provided with a central electrode 201 and wire line 209 enclosed within a shield conduit 205. Referring to Fig. 8, circuit B, the line 209 is connected to a resistor 331 by sliding contact 333 and with a battery 335, the opposite conductor of battery 335 being connected to ground and to the shield conduit 205. The resistor 331 is connected across a relay coil 337 similar in construction and action to relay 305 of circuit A. The circuit is completed by an armature 339 normally biased by spring 341 into rest with a contact 343.

The contact 343 connects through a conductor 345 with a contact 347 engaging a pressure responsive contact lever 349 making electrical contact through the lever 349 to one or more emergency break switches 351. The switches 351 connect in through a conductor 353. The switches 351 connect in series with a battery 355 through a conductor 357 and thence to a second relay coil 359 through a conductor 361, the circuit being completed by a conductor 363 leading to the armature 339. When this circuit is closed, this being the condition under normal operating conditions, the relay coil 359 is connected across the battery 355 energizing the coil 359, pulling downwardly on an armature 365 pivoted at 367. The armature 365 is weighted on the opposite end thereof from the relay coil 359 by a weight 369 and is provided with a latch 371 engaging the notched actuating lever 107 connecting with the valves 97 and 101 through the valve levers 103 and 105.

The circuit described at B in Fig. 8 is designed to remove the heavy water or slurry from the reaction tank 3 rapidly in the event of abnormally high neutron density within the reaction tank, under loss of pressure within the pressure tank 175 and for any other emergency, by manual control. Thus in operation the circuit comprising the armature 339, contact lever 349 and switches 351 may be broken at any of a number of points. Under abnorbally high neutron densities occurring within the reaction tank 3, such as upon failure of the control rod 9 to be returned to a position at which the reproduction ratio is less than unity, the contact between armature 339 and contact 343 is broken allowing the weight 369 to withdraw the latch 371 from the notched valve actuating lever 107. Such action causes the valve 97 to be closed and the valve 101 to be opened by falling of weight 372 thereby releasing the helium pressure maintained within the slurry reservoir 91, Fig. 1, or heavy water reservoir 169, Fig. 2. Such a reduction in pressure allows the check valve 93 to open, thereby dumping the heavy water or slurry into the reservoir and terminating the neutronic reaction in the reaction tank 3.

A dangerous condition might likewise ensue in the event that the helium pressure within the pressure tank 175 were to fall to a value materially below the pressure maintained in the reaction tank, inasmuch as the walls of the reaction tank are not designed to withstand the pressure therein. In this event, the connection between the contact lever 349 and electrical contact 347 is broken by release of the pressure within the pressure responsive means 350, likewise deenergizing the relay coil 359 and causing dumping of the heavy water or slurry from the reaction tank.

Other safety measures in addition to those recited above will at once be apparent to those familiar with power engineering problems, it being understood that other emergency circuits may be incorporated in combination with or in addition to the circuit shown in Fig. 8 at B. For example, the emergency break switches 351 may be of the manual type as indicated, or may be automatically responsive to other safety equipment.

The response of the reactor to insertion or withdrawal of the control rod is dependent upon the amount the reproduction ratio of the reactor exceeds unity and upon the rapidity with which neutrons are emitted by the uranium nucleus following fission thereof. Not all of the fast neutrons originating in the fission process are emitted immediately. About one percent of the fast neutrons are "delayed neutrons." These delayed fast neutrons appear from 0.01 second to several minutes after the fission has occurred. Half of these neutrons are emitted within six seconds and 0.9 within 45 seconds. The mean time of delayed emission is about 5 seconds. The cycle of neutron emission, migration through the moderator, slowing to thermal energy and fission capture is completed by 99 percent of the neutrons in about 0.0015 second, but if the reactor is near the balanced condition the extra 1 percent may make all the difference between an increase or a decrease in the neutronic activity. The fact that the last neutron in the cycle is held back, as it were, imparts a slowness of response to the reactor that would not be present if the neutrons were all emitted instantaneously. For cases in which the reproduction ratio ($R$) differs from unity by less than 1 percent, the ratio of neutrons present ($n$) after a given time $t$ to neutrons initially present ($n_0$) is given by the expression:

$$n = n_0 e^{wt}$$

where $$w = \frac{R-1}{\alpha - (R-1)} \cdot \frac{1}{T}$$

In this formula $\alpha$ is the fraction of the neutrons that are delayed, $\alpha = .01$, $T$ is the mean lifetime of the delayed neutron emission = 5 seconds.

As an example, assume $R$ become 1.001 as a result of raising the control rod. Then $$w = \frac{.001}{.01 - .001} \cdot \frac{1}{5} = \frac{1}{45}$$

that is, $n/n_0 = 2.72$ in 45 seconds. Thus doubling occurs about every 30 seconds and continues indefinitely.

If $R$ were made exactly 1.01, a more detailed theory shows that the neutron density would be tripled each second. However, if the reproduction ratio $R$ is suddenly increased several percent, so that the one percent delayed neutrons are unimportant compared with $R-1$, the neutron density increases at a much more rapid rate as given approximately by $R^{t/l}$ where $l$ is .0015 second, the normal time to complete a cycle. Thus if R were to be made 1.04, the neutron density would increase in 1.5 seconds by a factor of approximately $10^{17}$ over its original level. However, if R were 1.02 or 1.03, the factor by which the neutron density would be multiplied each second would be 1100 and 700,000 respectively. It is thus apparent that too high a reproduction ratio in a practical system leads to the necessity of providing safety measures which positively limit all danger of exceeding a permissible rate of neutron density increase. An exceedingly dangerous condition could exist if, by accident, the control rod were suddenly withdrawn to allow a rapid rise in neutron density, as the time required for inserting the control rod might be too long to prevent destruction of the sysetm. However, the quantity of uranium and heavy water used in the system is also dictated by the desired power output thereof and, as indicated, above, and particularly in large systems, it is desirable to utilize auxiliary neutron absorbing members permanently inserted in the reactor to reduce the reproduction ratio to a value only slightly above unity so that upon withdrawal of the control rod the rate of neutron density rise is low, allowing sufficient time to reinsert the control rod upon attaining the desired power output.

In addition to the usual industrial hazards during the operation of the reactor, operating personnel must be protected from excess exposure to gamma rays and neutrons generated in the reactor as well as from radiation from the auxiliaries containing the slurry or heavy water, from beta rays, from close contact with radioactive materials, and from radioactive poisoning due to inhalation of radioactive gases. The major portion of the radiation emitted from the reactor is intercepted by the lead surrounding the reactor and by the concrete shield. Since the heavy water vapor passing through the turbine, the condenser and other auxiliaries may contain gaseous fission products either from the dispersion or due to defective coatings on the sheathed fissionable rods the concrete surrounding this apparatus should be designed to protect operating personnel from gamma ray and fast neutron exposure. The shields should be designed to reduce the radiation from the structure to 0.10 roentgen per 8 hour day per person at the point of closest approach, this exposure being considered to be the maximum safe radiation permissible to which an individual may be subjected over the whole body.

Numerous variations are permissible without departure from the general scope of the invention. For example, other liquid moderators such as diphenyl or deuterocarbons or even a molten bismuth alloy may be used. Moreover the coolant used to cool the reactor need not be identical to the moderator. For example, the process herein contemplated may be used in connection with a carbon, beryllium, water or deuterium oxide moderated reactor provided with cooling coils therein through which is circulated another coolant. In such a case sufficient pressure may be maintained upon the coolant to prevent substantial boiling while it is in the reactor and pressure is released after removal of the coolant to form vapor from which energy may be recovered in any convenient manner.

From the foregoing it will be appreciated that I have provided a neutronic reaction system suitable for producing steam developing power in the form of electrical energy, and that while the theory of the nuclear fission mechanism in uranium set forth herein is based on the best presently known experimental evidence, I do not wish to be bound thereby, as additional experimental data later discovered may modify the theory disclosed. Any such modification of theory however, will in no way affect the results to be obtained in the practice of the invention herein described and claimed.

What is claimed is:

In a nuclear-reactor system, the combination comprising a tank, upper and lower baffles extending across and within the tank and having apertures in their periphery adjacent the tank walls, vertical tubes piercing the baffles and extending therebetween, elongated coated thermal-neutron-fissionable rods positioned in the tubes so that there is an annular space between each rod and the associated tube throughout the length of the rod, heavy-water moderator filling said tank so as to lie in the annular spaces between the tubes and the rods, between the baffles and around the tubes, and above and below the baffles, an expansion chamber connected with the upper end of the tank, a nozzle carried at the connection of the tank with the expansion chamber and extending into the latter, an energy-consuming unit for the conversion of thermal energy to mechanical energy, a pipe line connecting the expansion chamber with the intake side of the energy-consuming unit, means for piping heavy-water condensate from the exhaust side of the unit to the bottom of the tank, and means for piping heavy water to the bottom of the tank from a region of the expansion chamber between the ends of the nozzle.

References Cited in the file of this patent

UNITED STATES PATENTS

| 586,281 | Beckman | July 13, 1897 |
|---|---|---|
| 653,436 | Buck | July 10, 1900 |
| 933,937 | White | Sept. 14, 1909 |
| 973,603 | Winslow | Oct. 25, 1910 |
| 1,677,798 | Ruths | July 17, 1928 |
| 1,916,277 | Miller | July 4, 1933 |
| 2,429,035 | Steving | Oct. 14, 1947 |
| 2,708,656 | Fermi et al. | May 17, 1955 |

FOREIGN PATENTS

| 114,150 | Australia | May 2, 1940 |
|---|---|---|
| 233,011 | Switzerland | Oct. 2, 1944 |

OTHER REFERENCES

"Power," July 1940, article entitled "Uranium-power fuel of the future?" Swain, pp. 56–59.

Business Week, Sept. 1, 1945, pp. 57–64.

MDDC–893 U. S. Atomic Energy Commission (article by F. Daniels) date of manuscript Apr. 1, 1947, pp. 6, 10, 11.

Goodman: "The Science and Eng. of Nuclear Eng.," vol. I, p. 275, Addison-Wesley (1947).

Kelly et al.: Phy. Rev, 73, 1135–39 (1948).

Nuclear Reactor Development, July 1954 (from a meeting held under the auspices of Atomic Industrial Forum, 260 Madison Ave., New York, edited by O. Townsend and E. Wiggin), p. 18.